United States Patent [19]
Bailly et al.

[11] Patent Number: 5,106,804
[45] Date of Patent: Apr. 21, 1992

[54] CATALYST AND PREPOLYMER USED FOR THE PREPARATION OF POLYOLEFINS

[75] Inventors: Jean-Claude Bailly, Martigues; Philippe Bres, Fos-sur-Mer; Christine Chabrand, Martigues; Erick Daire, Chateauneuf-les-Martigues, all of France

[73] Assignee: BP Chemicals Limited, London, England

[21] Appl. No.: 625,829

[22] Filed: Dec. 11, 1990

[30] Foreign Application Priority Data

Dec. 22, 1989 [FR] France .................. 89 17402

[51] Int. Cl.$^5$ .............................. C08F 4/654
[52] U.S. Cl. ....................... 502/108; 502/9; 502/10; 502/104; 502/117; 525/125
[58] Field of Search .............. 502/9, 10, 104, 108, 502/117

[56] References Cited

U.S. PATENT DOCUMENTS

| | | | |
|---|---|---|---|
| 4,295,991 | 10/1981 | Wristers | 502/108 X |
| 4,588,703 | 5/1986 | Cowan et al. | 502/117 X |
| 4,659,685 | 4/1987 | Coleman et al. | 502/117 X |
| 4,814,314 | 3/1989 | Matsuura et al. | 502/108 X |
| 4,960,741 | 10/1990 | Bailly et al. | 502/10 |

FOREIGN PATENT DOCUMENTS 0120734  2/1984  European Pat. Off. .
0336545  2/1989  European Pat. Off. .

Primary Examiner—Patrick P. Garvin
Attorney, Agent, or Firm—Brooks Haidt Haffner & Delahunty

[57] ABSTRACT

The present invention relates to a solid catalyst suitable for polymerizing olefins in a heterogeneous process, the catalyst consisting of spheroidal particles having a narrow particle size distribution and comprising (i) a support containing magnesium dichloride and an electron-donor free from labile hydrogen, (ii) a zirconium metallocene, and (iii) optionally an organoaluminium compound which is an aluminoxane preferably. The solid catalyst may be used in the form of a prepolymer comprising a polyethylene or a copolymer of ethylene and an active zirconium metallocene catalyst essentially consisting of atoms of Zr, Mg, Cl and Al, preferably in the form of spheriodal particles. The solid catalyst or the prepolymer may be used for producing polyethylene or copolymer of ethylene having from 0.5 to 20 ppm of zr and a molecular weight distribution from 2 to 5, in the form of a powder having a bulk density from 0.3 to 0.55 g/cm$^3$, preferably consisting of spheroidal particles.

28 Claims, No Drawings

CATALYST AND PREPOLYMER USED FOR THE PREPARATION OF POLYOLEFINS

The present invention relates to a solid catalyst based on zirconium supported on magnesium chloride and to a prepolymer containing the catalyst. It also relates to a process for preparing with this catalyst or this prepolymer a polyolefin, especially a polymer or a copolymer of ethylene.

It is known that it is possible to manufacture polyolefins in the presence of a catalyst system comprising a catalyst based on a zirconium metallocene and a cocatalyst consisting of an organoaluminium compound, especially an aluminoxane. However, this catalyst is preferably employed in solution in an aromatic hydrocarbon; it is not suited to heterogeneous processes of polymerization in suspension in aliphatic hydrocarbons or in gaseous phase.

According to U.S. Pat. No. 4,659,685, it is also known to manufacture polyolefins with the aid of a catalyst system comprising a solid catalyst consisting of a zirconium metallocene deposited on a support such as a refractory oxide or a magnesium chloride. However, the polyolefins thus obtained generally have a relatively broad molecular weight distribution.

For a number of years attempts have been made to develop a high-activity solid catalyst comprising a zirconium metallocene for a heterogeneous process of the (co)-polymerization of olefins, especially ethylene. In particular, a solid catalyst which has a relatively high zirconium content has been sought. Attempts have been made, furthermore, to develop a catalyst suited to the heterogeneous processes of polymerization of olefins in suspension in an aliphatic hydrocarbon or in gaseous phase, processes in which it is important to be able to control the size, the particle size distribution and the morphology of the catalyst particles at the same time. It has also been shown to be important that any new solid catalyst should be able to withstand the growth stresses during the polymerization, especially the initial stage of a gas phase polymerization. We have found that the growth stresses with zirconium metallocene catalysts are generally much greater than those of a catalyst based on a titanium or vanadium chloride which is less active in olefin polymerization. It is also desirable that the solid catalyst be capable of producing an ethylene polymer or an ethylene copolymer with an easily controllable average molecular weight and a narrow molecular weight distribution, so as to enable this polymer or copolymer to be shaped using injection and moulding.

It has now been found that it is possible to prepare a solid catalyst with high activity in the (co)polymerization of olefins, containing a zirconium metallocene, preferably in a relatively high quantity, supported on a special magnesium chloride. In particular, this catalyst is in the form of spheroidal particles which are suited to the heterogeneous polymerization of olefins in suspension or in gaseous phase and which are capable of withstanding the enormous growth stresses during the polymerization. This catalyst may be used as such in polymerization or in the form of an active prepolymer, producing polymers or copolymers of ethylene have particular features.

The present invention relates therefore to a solid catalyst suitable for a heterogeneous process for polymerizing one or more olefins, in particular ethylene, the solid catalyst consisting of spheroidal particles having a mass-average diameter, $D_m$, of 10 to 100 microns and a narrow particle size distribution such that the ratio of $D_m$ to the number-average diameter, $D_n$, of the particles is not higher than 3, this catalyst comprising:
- a support containing from 80 to 99.9 mol % of magnesium dichloride and from 0.1 to 20 mol % of at least one organic electron-donor compound, D, free from labile hydrogen,
- a zirconium metallocene preferably with an atomic ratio of Zr/Mg ranging from 0.001 to 0.1, and
- optionally an organoaluminium compound preferably with an atomic ratio Al/Zr ranging from 0 to 500.

Any of the support, the zirconium metallocene and organoptionally the oaluminium compound, constituting the components of the catalyst, may have complexed or reacted with one another.

The solid catalyst has a particular magnesium chloride support containing a relatively large quantity of an organic electron-donor compound D. The support comprises magnesium chloride and compound D in relative molar percentages of from 80 to 99.9 mol % preferably from 85 to 99.5 mol % and especially from 90 to 99.5 mol % of magnesium dichloride and from 0.1 to 20 mol % preferably from 0.5 to 15 mol % and especially from 0.5 to 10 mol % of the compound D.

The support, which is based essentially on magnesium dichloride, may additionally contain a chlorine containing aluminium derivative, such as aluminium trichloride, as well as optionally a magnesium chloride containing some Mg—C bonds. The quantity of chlorine containing aluminium derivative may be lower than or equal to 30 mol %, preferably 20 mol % or less relative to the magnesium dichloride such as 1 to 20 mol %. The quantity of mg—C bond may be lower than or equal to 5 mol %, preferably 0.1 mol % or less relative to the magnesium. Especially, the support contains substantially no Mg—C bond.

The organic electron-donor compound, D, is generally known as a Lewis base and must be free from labile hydrogen. It cannot, for example, be chosen from water, alcohols or phenols. It has an ability to complex magnesium dichloride. It is advantageously chosen from ethers, thioethers, esters, sulphones, sulphoxides, secondary amides, tertiary amines, tertiary phosphines and phosphoramides. Electron-donor compounds of low complexing power, such as cyclic or non-cyclic ethers, are preferred.

The organic electron-donor compound, D, is advantageously distributed homogeneously throughout the support particle, forming a homogeneous composition of magnesium dichloride and compound D. Consequently, a support of this kind cannot generally be prepared merely by bringing anhydrous magnesium dichloride particles into contact with the compound D. For this reason it is recommended that the support be prepared by precipitation of magnesium dichloride in the presence of the compound D.

The catalyst consists of spheroidal particles which have a substantially spherical shape, e.g. in which the ratio D/d of the particles is close to 1, D and d being the major axis and the minor axis of the particles respectively. The ratio D/d is generally lower than or equal to 1.5, preferably 1.3 or less, such as 1 to 1.5 or 1 to 1.3.

The catalyst particles have a mass-average diameter of 10 to 100 microns, preferably 15 to 70 and especially 20 to 50 microns. They have a narrow particle size distribution, such that the ratio $D_m/D_n$ of the mass-average diameter, Dm, to the number-average diameter, Dn, is not higher than 3, preferably not higher than 2.5 and especially not higher than 2 such as 1 to 3, or 1 to 2.5, or 1 to 2 and especially 1.1 to 1.5. Preferably, there is a virtually total absence of particles of diameter greater than 1.5×Dm or smaller than 0.6×Dm; the particle size distribution is usually such that more than 90% by weight of the particles of the same single batch have a particle size in the range Dm±10%.

The solid catalyst also contains zirconium metallocene. In particular, the zirconium metallocene is a metallocene containing a tetravalent zirconium with at least one Zr—C bond which is a covalent or pi-bonded one. It is also called zirconocene, which preferably corresponds to the general formula $$R^4R^5R^6R^7Zr$$

in which $R^4$ denotes a cycloalkadienyl radical or cycloalkadienyl radical substituted by at least one alkyl radical e.g. of 1 to 6 carbon atoms, such as methyl or ethyl, or by at least one alkoxy radical e.g. of 1 to 6 carbon atoms, or a fused ring cycloalkadienyl group e.g. of 7 to 14 carbon atoms such as indenyl or tetrahydroindenyl and each of $R^5$, $R^6$ and $R^7$ being identical or different denotes a cycloalkadienyl radical, a cycloalkadienyl radical substituted by at least one alkyl or alkoxy group e.g. of 1 to 6 carbon atoms such as methyl, ethyl, methoxy, ethoxy, propoxy or butoxy, an aryl radical e.g. an aromatic hydrocarbyl group such as one of 6 to 19 carbon atoms, e.g. phenyl, an alkyl radical e.g. of 1 to 6 carbon atoms such as methyl or ethyl, a cycloalkyl radical e.g. of 5 to 7 carbon atoms, such as cyclohexyl, an aralkyl radical e.g. of 7 to 19 carbon atoms, such as aromatic hydrocarbyl alkyl e.g. benzyl, a halogen atom e.g. chlorine or bromine, an alkoxy radical e.g. of 1 to 12 carbon atoms, such as methoxy, ethoxy, propoxy or butoxy, or a hydrogen atom. Provided that when $R^5$ represents a cycloalkadienyl radical or a substituted cycloalkadienyl radical or fused ring cycloalkadienyl group, $R^4$ and $R^5$ may be bonded to each other either directly or via a lower alkylene group e.g. of 1 to 4 carbons. The cycloalkadienyl radical is preferably one with a conjugated C5 ring diene group, such as a cyclopentadienyl. Examples of suitable radicals for $R^4$, $R^5$, $R^6$ or $R^7$ may contain 6 to 22 carbon atoms and preferably are methylcyclopentadienyl, ethylcyclopentadienyl, dimethylcyclopentadienyl, indenyl, ethylenebisindenyl or tetrahydroindenyl radical. The zirconium metallocene may, in particular, be chosen from bis(cyclopentadienyl)dichlorozirconium, bis(cyclopentadienyl) methylchlorozirconium and bis(4,5,6,7-tetrahydroindenyl) ethylenedichlorozirconium. Preferably, the zirconium metallocene also comprises at least one Zr—X bond, wherein X represents a halogen atom e.g. a chlorine or bromine atom, or an alkoxy group e.g. of 1 to 12 carbon atoms.

The zironium metallocene is present in the solid catalyst with a Zr/Mg atomic ratio preferably ranging from 0.001 to 0.1, particularly from 0.002 to 0.05, especially from 0.01 to 0.05.

The solid catalyst may optionally comprise an organoaluminium compound such as a trialkylaluminium, e.g. trimethylaluminium, or an alkylaluminium hydride, an alkylaluminium alkoxide, or an alkylaluminium halide, e.g. diethylaluminium chloride, preferably an aluminoxane which may be either a linear aluminoxane corresponding to the general formula $$(R)_2AlO(Al(R)—O)_nAl(R)_2$$

in which each R denotes an alkyl radical e.g. of 1 to 6 carbon atoms, such as methyl or ethyl, and n is a number ranging from 2 to 40, preferably from 10 to 20, or a cyclic aluminoxane corresponding to the general formula

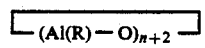

in which R and n are as defined above. The aluminoxane is preferably a methylaluminoxane.

The organoaluminium compound, preferably the aluminoxane, may be present in the solid catalyst with an Al/Zr atomic ratio ranging from 0 to 500, preferably from 1 to 300 and especially from 10 to 100.

The present invention also relates to a process for the preparation of the solid catalyst, characterized in that:
(1) a solid support (A) containing from 80 to 99.5 mol % of magnesium dichloride and from 0.5 to 20 mol % of at least one organic electron-donor compound, D, free from labile hydrogen, the solid support (A) being in the form of spheroidal particles having a mass-average diameter, Dm, of 10 to 100 microns preferably 15 to 70 and especially 20 to 50 microns and a narrow particle size distribution such that the ratio of Dm to the number-average diameter Dn of the particles is not higher than 3, preferably not higher than 2.5 and especially not higher than 2, is brought into contact
(2) with a zirconium metallocene (B), and optionally with an organoaluminium compound (C), preferably an aluminoxane. The contact of (A) with (B) and (C) may be performed in various ways, for instance by contacting (A) either with (B) followed by (C) or vice versa.

The solid support (A) employed for preparing the catalyst comprises from 80 to 99.5 mol % preferably from 80 to 95 mol % and especially from 80 to 90 mol % of magnesium dichloride and from 0.5 to 20 mol % preferably from 5 to 20 mol % and especially from 10 to 20 mol % of the compound D. The specific surface area (BET) of (A) may be from 20 to 100 m2/g, preferably from 30 to 60 m2/g. The solid support (A) consist of spheroidal particles whose shape, size and particle size distribution are identical with those of the catalyst particles described above. It may contain a chlorine containing aluminium derivative and magnesium products comprises some Mg—C bond in quantities identical to those of the catalyst described above.

The support may, in particular, be prepared by reacting a dialkylmagnesium compound with an organic chlorine compound. In that case, the presence of the electron-donor compound, D, acting as a complexing agent and not as a reactant is necessary for preparing the particular support (A). For this reason in this production process, the compound D cannot be chosen from electron-donor compounds, such as esters, capable of reacting with organomagnesium compounds. The dialkylmagnesium compound chosen may be a product of formula $R^1MgR^2$ in which $R^1$ and $R^2$ are identical or different alkyl radicals containing from 2 to 12 carbon atoms and which is soluble in the hydrocarbon medium in which the preparation of the support will preferably be carried out. The organic chlorine compound is an alkyl choride of formula $R^3Cl$ in which $R^3$ is a secondary or, preferably, tertiary alkyl radical, preferably containing from 3 to 12 carbon atoms. It is preferred to employ, as electron-donor compound, D, an ether of formula $R^8OR^9$ in which $R^8$ and $R^9$ are identical or different alkyl radicals, especially containing from 1 to 12 carbon atoms.

The various reactants used for the preparation of the support (A) can be used with:

a molar ratio $R^3Cl/R^1MgR^2$ of from 1.5 to 2.5, preferably from 1.9 to 2.3, and a molar ratio $D/R^1MgR^2$ of from 0.1 to 1.2, preferably from 0.3 to 0.8.

The reaction between $R^1MgR^2$ and $R^3Cl$ in the presence of the electron-donor compound, D, is a precipitation which takes place in an inert liquid medium e.g. a liquid hydrocarbon, with stirring preferably at a temperature of 0° to 100° C. To obtain an excellent support, in particular one with a large quantity of the electron-donor compound, D, it is recommended to perform the precipitation reaction at a relatively low temperature ranging from 10° to 50° C., preferably from 15° to 35° C. Preferably the precipitation reaction should proceed extremely slowly, over a period of at least 10 hours e.g. 10 to 50 hours, preferably a period ranging from 10 to 24 hours, so as to permit a suitable formation of the solid product, in particular the insertion of a large quantity of compound D and its uniform dispersion in the support.

During the preparation of the catalyst, the support (A) is employed in the form of a suspension in a saturated aliphatic hydrocarbon or preferably in an aromatic hydrocarbon, in particular toluene. It is also preferred to use it in the form of a dry powder, in an anhydrous and inert atmosphere, for example in a nitrogen atmosphere.

The zirconium metallocene (B) is preferably used in the preparation of the catalyst in the form of a solution in a hydrocarbon solvent, especially in an aromatic hydrocarbon such as toluene. The solution may be at a concentration ranging from 0.1 to 50 millimoles of zirconium per liter.

The organoaluminium compound (C) is preferably used in the preparation of the catalyst, in the form of a solution in a hydrocarbon, in particular in an aromatic hydrocarbon such as toluene. The solution may be at a concentration ranging up to 30% by weight of aluminium.

The contact of the solid support (A) with the zirconium metallocene (B) may be brought about in various ways. It is possible, for example, to add the solid support (A) to a solution of the zirconium metallocene (B), or the reverse.

The contact is preferably brought about in the presence of the compound (C) preferably the aluminoxane such as described above. In this case, a solution of the zirconium metallocene (B) and a solution of the compound (C) may be added to the solid support (A) either simultaneously or especially as a previously prepared mixture. It is also possible to add the solid support (A) to the mixture of these two solutions.

The contact may also be brought about by successively adding to the solid support (A) a solution of the zirconium metallocene (B) and then a solution of the compound (C). It is also possible to add successively to (A) a mixture of the solution of (B) with a part of the solution of (C), and then the remainder of the solution of (C). The contact may also be brought about by first of all adding to the solid support (A) a solution of (C) and then a solution of (B). It is also possible to add to the solid support (A) first of all a mixture of the solution of (C) with a part of the solution of (B), and then the remainder of the solution of (B). These successive additions may be carried out by being sequenced immediately one after the other or else by being separated by a period ranging from a few minutes to a few hours, preferably from 10 minutes to 5 hours.

In all cases it is preferable that the contact be brought about with agitation e.g. stirring, for a total period ranging from 1 minutes to 10 hours, preferably from 10 minutes to 5 hours. During the contact, the addition of a component may be very fast or slow and uniform over a period which can range from 5 minutes to 5 hours. The temperature may be from 0° C. to the boiling temperature of the hydrocarbon solvent employed in the solutions, and is preferably from 0° C. to 110° C. When the catalyst preparation is carried out in the presence of the compound (C) and when the latter is used separately from the zirconium metallocene (B), the contact of the solid support (A) with the compound (C) may be brought about at a temperature other than that of bringing the solid support (A) into contact with the zirconium metallocene (B).

The quantities of the components used for preparing the solid catalyst may be such that:

the molar ratio of the quantity of Zr of the zirconium metallocene (B) to that of Mg of the solid support (A) is from 0.001 to 1, preferably from 0.005 to 0.5, the molar ratio of the quantity of Al of the compound (C) to that of Zr of the zirconium metallocene (B) is from 0 to 1,000, preferably from 5 to 500.

The catalyst preparation may be carried out in the presence of an electron-donor compound added when the components are brought into contact, it being possible for this electron-donor compound to be identical to or different from the compound (D) present in the solid support (A). It may be chosen from organic electron-donor compounds, free from labile hydrogen, and from organic silicon compounds such as silane compounds having the general formula $R^{10}_{4-n}Si(OR^{11})_n$ wherein $R^{10}$ and $R^{11}$ being identical or different denote alkyl, aryl, cycloalkyl or aralkyl radicals e.g. of 1 to 19 carbon atoms, and n is a number ranging from 1 to 4; the silane compound may be cyclohexylmethyldimethoxy silane.

The catalyst is obtained in the form of a solid which can be isolated by removing the hydrocarbon solvent(s) employed during the preparation. The solvent(s) may, for example, be evaporated off at atmospheric pressure or at a lower pressure. The solid catalyst may also be washed with liquid hydrocarbon, preferably a saturated aliphatic hydrocarbon such as n-hexane or n-heptane. The catalyst is in the form of spheroidal particles whose morphology, size and particle size distribution are substantially identical with those of the solid support (A) employed for preparing the catalyst and are otherwise as described above.

It has surprisingly been found that the catalyst may comprise a relatively large quantity of zirconium metallocene. It is thought that this surprising result is due to the fact that the solid magnesium chloride support employed is of a particular nature and that is comprises, in particular, an electron-donor compound (D) free from labile hydrogen and dispersed homogeneously in the support, in a relatively large quantity. This result is all the more surprising since the zirconium metallocene (B) is an organometallic product and no particular reaction is expected between the zirconium metallocene (B), the magnesium dichloride and the electron-donor compound (D).

The solid catalyst may be employed directly in a (co)polymerization of olefin, e.g. C2 to C8 alpha-olefin, such as ethylene or propylene, preferably ethylene, in the presence of a cocatalyst chosen from the organometallic compounds of a metal belonging to group II or III of the Periodic Classification of the elements. In particular, the cocatalyst may be one or more organoaluminium compounds such as a trialkylaluminium, an alkylaluminium hydride, an alkylaluminium alkoxide or an alkylaluminium halide, e.g. with each alkyl group of 1 to 10 carbon atoms, such as trimethylaluminium, triethylaluminium, tri-n-hexylaluminium, tri-n-octylaluminium, or diethylaluminium chloride, but preferably an aluminoxane corresponding to one of the general formulae mentioned above in particular when the catalyst does not comprises an aluminoxane, as compound (C). The aluminoxane employed as cocatalyst during the polymerization may be identical to or different from that optionally present in the catalyst as compound (C). The aluminoxane may be employed mixed with an organoaluminium such as trimethylaluminium. The quantity of cocatalyst employed in polymerization is such that the molar ratio of the quantity of metal in the cocatalyst to that of zirconium in the catalyst is between 1 and 10,000, preferably between 10 and 1,000.

The solid catalyst may be employed as such in polymerization or preferably in the form of a prepolymer of olefins. A prepolymerization step is a preferred method in a heteregeneous process for polymerizing olefins by means of the present catalyst, because the zirconium metallocene of the catalyst is more strongly fixed in the support than a non-prepolymerized catalyst and it is less capable of being extracted from the catalyst and producing fine particles of polymer during the polymerisation. Another advantage of transforming the present catalyst into a prepolymer is the improvement of the quality of the polymers obtained therefrom, in particular a polymer powder with a better morphology, higher bulk density and improved flowing properties.

The prepolymer is obtained by bringing the solid catalyst into contact with at least one olefin, e.g. $C_2$ to $C_8$ alpha-olefin, such as ethylene or propylene, preferably ethylene or a mixture of ethylene and at least one alpha-olefin containing from 3 to 8 carbon atoms. The prepolymerization may be performed in a slurry in a liquid hydrocarbon or in a gas phase, at a temperature from 0° C. to 100° C., preferably from 20° C. to 90° C., especially from 50° to 80° C., and under a total pressure from 0.1 to 5 MPa. The prepolymerization may be performed in the presence of a cocatalyst, such as that described above, either by adding to the prepolymerization medium the cocatalyst, preferably an aluminoxane or a mixture of an aluminoxane with an organoaluminium compound such as a trialkylaluminium, or by using the catalyst containing a sufficient quantity of the organoaluminium compound (C) preferably an aluminoxane, or by a combination of the two methods, in such a way that the total atomic ration of Al/Zr in the prepolymerization medium is from 10 to 1000, preferably from 50 to 500. The cocatalyst added to the prepolymerization medium, if any, may be identical or different from that employed during the polymerization. The prepolymerization may be stopped when the prepolymer contains from 1.0 to 500, preferably from 10 to 400 g of polyolefin per millimole of zirconium.

The prepolymer constitutes a further aspect of the invention and preferably consists of particles of polyethylene or copolymer of ethylene with up to 10% by weight of at least one C3 to C8 alpha-olefin, and comprises an active zirconium metallocene catalyst for a further (co-)polymerization of olefins, essentially comprising atoms of zirconium, magnesium, chlorine and aluminium and being preferably free from refractory oxide, such as alumina or silica, the prepolymer containing from 0.1 to 500, preferably from 10 to 400 g of polyethylene or copolymer of ethylene per millimole of zirconium, and having an atomic ratio of Al/Zr from 10 to 1000, preferably from 50 to 500. Advantageously the prepolymer may consist of spheroidal particles, having a mass-average diameter, Dm, from 10 to 500 preferably from 30 to 300 and especially from 50 to 250 microns and a narrow particle size distribution such that the ratio of Dm to the number-average diameter Dn of the particles is not higher than 3, preferably not higher than 2.5 and especially not higher than 2.

The catalyst or the prepolymer is particularly suitable for a heterogeneous polymerization process, either in suspension in a saturated aliphatic hydrocarbon or in gaseous phase in a fluidized bed, under a total pressure of 0.1 to 5 MPa and at a temperature of 10° to 100° C., in the presence of a catalyst, such as that described above, preferably an organoaluminium compound and especially an aluminoxane or a mixture of a trialkylaluminium with an aluminoxane, such as that described above, in a quantity such that the total atomic ratio of Al/Zr in the (co-)polymerization medium is from 10 to 1000, preferably from 50 to 500. The catalyst or the prepolymer is preferably used in a gaseous phase polymerization process, such as in a fluidized bed, because the polymers or copolymers of ethylene thus obtained generally consist of powders having improved flowing properties and higher bulk density in comparison with those obtained in a slurry process.

The polymers or copolymers of ethylene obtainable according to the present invention, preferably in a gaseous phase (co-)polymerization process, constitutes a further aspect of the invention and may have a density from 0.89 to 0.965 g/cm$^3$, a melt index (measured according to ASTMD 1238 condition E) from 0.01 to 50, preferably from 0.1 to 20 g/10 minutes, a molecular weight distribution (expressed by Mw/Mn) from 2 to 5, preferably from 2 to 4, catalyst residues free from refractory oxide, such as silica or alumina, essentially consisting of atoms of magnesium, chlorine, aluminium and zirconium, the quantity of zirconium being 0.5 to 20, preferably from 1 to 10, especially from 1 to 5 (ppm) parts per million by weight, and a level of ethylenic unsaturation not higher than 0.6, e.g. 0.1 to 0.6 and preferably from 0.3 to 0.5 per 1000 carbon atoms, in particular a level of vinyl unsaturation not higher than 0.5 e.g. 0.1 to 0.5, preferably from 0.2 to 0.4 per 1000 carbon atoms, and a level of vinylidene unsaturation not higher than 0.2 e.g. 0.01 to 0.2 and, preferably from 0.05 to 0.1 per 1000 carbon atoms. The copolymer of ethylene may contain up to 30% by weight, e.g. from about 0.1 to 25% by weight preferably from 5 to 25% by weight of at least one C3 to C8 alpha-olefin e.g. propylene, butene-1, hexane-1, methyl-4-pentene-1 or octane-1. Advantageously, the polymers or copolymers of ethylene are in the form of a powder having a bulk density from 0.3 to 0.55, preferably from 0.35 to 0.5 g/cm$^3$, and preferably consisting of spheroidal particles, having a mass-average diameter, Dm, from 150 to 1000, preferably from 300 to 800 microns and a narrow particle size distribution such that the ratio of Dm to the number-average diameter Dn of the particles is not higher than 3, preferably not higher than 2.5 and especially not higher than 2.

When the weight average molecular weight, Mw, of the polymers or copolymers of ethylene is from $10^5$ to $3 \times 10^5$, the molecular weight distribution (expressed by Mw/Mn) is very narrow, particularly in the range from 2 to 4, preferably from 2 to 3.5.

Method of Determining the Mass-Average (Dm) and Number-Average (Dn) Diameters of Particles The mass-average (Dm) and number-average (Dn) diameters of the support or catalyst particles are measured on the basis of microscopic observations, by means of the Optomax image analyser (Micro-Measurements Ltd, Great Britain). The principle of the measurement consists in obtaining, from the experimental study of a population of particles using optical microscopy, a frequency table which gives the number (ni) of particles belonging to each class (i) of diameters, each class (i) being characterized by an intermediate diameter (di) included within the limits of the said class. According to the approved French Standard NF X 11-630 of June 1981, Dm and Dn are given by the following formulae:

$$\text{mass-average diameter: } Dm = \frac{\Sigma\, ni(di)^3 di}{\Sigma\, ni(di)^3}$$

$$\text{number-average diameter: } Dn = \frac{\Sigma\, ni \cdot di}{\Sigma\, ni}$$

The ratio Dm/Dn characterizes the particle size distribution; it is sometimes called "width of the particle size-distribution". The measurement using the Optomax image analyser is carried out by means of an inverted microscope which permits the examination of the suspensions of support or catalyst particles with a magnification of between 16 and 200 times. A television camera picks up the images given by the inverted microscope and transmits them to a computer which analyses the images received line by line and point by point on each line, in order to determine the particle dimensions or diameters, and then to classify them.

Measurement of the Molecular Weight Distribution

The molecular weight distribution of a (co)polymer is calculated according to the ratio of the weight-average molecular weight, Mw, to the number-average molecular weight, Mn, of the (co)polymer, from a molecular weight distribution curve obtained by means of a "Waters"(Trademark) model "150" R gel permeation chromatograph (High Temperature Size Exclusion Chromatograph), the operating conditions being the following:

solvent: 1,2,4-trichlorobenzene
solvent flow rate: 1 ml/minute
three "Shodex" R (Trademark) model "AT 80 M S" columns
temperature: 150° C.
sample concentration: 0.1% by weight
injection volume: 500 microliters
detection by a refractometer integral with the chromatograph
calibration using a high density polyethylene sold by BP Chemicals S.N.C. under the trade number "Rigidex 6070EA"; Mw=65,000 and Mw/Mn=4 and a high density polyethylene which has: Mw=210,000 and Mw/Mn=17.5.

The following nonlimiting examples illustrate the invention.

EXAMPLE 1 a) Preparation of a Support 10.2 liters of a mixture containing 10 moles of dibutylmagnesium in n-hexane, followed by 6.45 liters of n-hexane and finally 1 liter of diisoamyl ether were introduced in the course of a first stage under nitrogen, at room temperature, into a 30-liter stainless steel reactor equipped with a stirrer rotating at a speed of 500 revolutions per minute and a jacket. In a second stage, during which the speed of the stirrer was maintained at 500 revolutions per minute and the reaction temperature at 25° C., 2.4 l of tert-butyl chloride were added to the mixture thus obtained, at a constant flow rate for 12 hours. At the end of this period the reaction mixture was maintained at 25° C. for 3 hours. The precipitate obtained was washed six times, each with 15 liters of n-hexane. The solid product obtained constituted the magnesium dichloride support, containing 0.12 moles of diisoamyl ether per mole of magnesium dichloride and less than 0.001 mole of Mg—C bond. When examined with a microscope, the support was in the shape of spheroidal particles which had a mass-average diameter of 35 microns and an extremely narrow particle size distribution, such that the Dm/Dn ratio of the particles was equal to 1.4

The specific surface area of the support was approximately 45 m2/g (BET). The support was isolated in the form of a dry powder, under nitrogen atmosphere, after the n-hexane had been evaporated off under vacuum, at 50° C.

b) Preparation of a Catalyst

A quantity of previously prepared support in the form of a dry powder corresponding to 100 millimoles of Mg was introduced at 25° C. under nitrogen atmosphere into a glass reactor with a capacity of 1 liter, equipped with a stirrer rotating at 350 revolutions per minute and with a heating and cooling system. 100 ml of a solution of bis(cyclopentadienyl)dichlorozirconium (Cp2ZrCl2) in toluene containing 5 millimoles of Zr were then introduced into the reactor with stirring. The mixture was then kept stirred at 25° C. for 2 hours. At the end of this period the stirring was stopped and the solid catalyst thus obtained was washed four times, each with 200 ml of n-hexane. A solid catalyst which was ready for use was obtained in the form of spheroidal particles which had Dm=35 microns and a Dm/Dn ratio=1.4. It contained the elements Zr and Mg and diisoamyl ether in the following molar ratios:
Zr/Mg=0.03
diisoamyl ether/Mg=0.025 c) Polymerization of Ethylene in Suspension in N-hexane 750 ml of n-hexane were introduced under a nitrogen atmosphere into a stainless steel reactor with a capacity of 2 liters, equipped with a stirrer rotating at 350 revolutions/minute and with a heating and cooling system. The reactor was heated to 70° C. and a quantity of previously prepared catalyst was introduced into it, corresponding to 0.1 millimole of zirconium and 15 milliatoms of aluminium as methylaluminoxane (MAO) in solution at a concentration of 30% by weight in toluene, the solution of (MAO) being sold by Schering Company (Germany). Ethylene was then introduced into the reactor at a steady flow rate of 120 g/h during 2 hours. At the end of this period the polymerization was stopped and after the n-hexane had been removed a polyethylene powder was recovered, consisting of spheroidal particles which had Dm=150 microns and a Dm/Dn ratio=1.5. The melt index of the polyethylene was 0.95 g/10 minutes, measured at 190° C. under a weight of 2.16 kg (ASTM D 1238 Condition E). The Mw/Mn ratio of the polyethylene, measured by GPC, was 2.3

EXAMPLE 2 a) Preparation of a Support

This was exactly identical with that of Example 1.

b) Preparation of a Catalyst

A quantity of previously prepared support in the form of a dry powder corresponding to 100 millimoles of Mg was introduced at 25° C. under nitrogen atmosphere into a glass reactor with a capacity of 1 liter, equipped with a stirrer rotating at 350 revolutions per minute and with a heating and cooling system. 100 ml of a mixture containing 1 millimole of (Cp2ZrCl2) and 100 milliatoms of aluminium as (MAO) in solution at a concentration of 30% by weight in toluene were then introduced into the reactor with stirring. The mixture thus obtained was then kept stirred at 25° C. for 2 hours. At the end of this period the stirring was stopped and the solid catalyst thus obtained was washed four times, each with 200 ml of n-hexane at 25°C. A solid catalyst which was ready for use was obtained in the form of spheroidal particles which had Dm=35 microns and a Dm/Dn ratio=1.4. It contained the elements Zr, Mg and Al and diisoamyl ether in the following molar ratios:

Zr/Mg=0.005
Al/Zr=49
diisoamyl ether/Mg=0.02 c) Polymerization of Ethylene in Suspension in N-hexane

The procedure was exactly as in the Example 1.c. except that the catalyst was that prepared in Example 2.b.

A polyethylene powder was obtained, consisting of spheroidal particles which had Dm=150 microns and a Dm/Dn ratio=1.5. The melt index of the polyethylene was 1.5 g/10 minutes, measured at 190° C. under a 2.16 kg weight. The Mw/M ratio of the polyethylene was 2.2.

EXAMPLE 3 a) Preparation of a support

The procedure was exactly as in Example 1.

b) Preparation of a Catalyst

The procedure was exactly as in Example 2, except that the temperature was fixed at 50° C. during the introduction of the components into the reactor and during the two hours when the mixture was kept stirred. After the end of this period the reactor was cooled to 25°C. and the catalyst was washed as in Example 2. A catalyst was obtained in the form of spheroidal particles which had Dm=35 microns and a Dm/Dn ratio=1.4.

It contained the elements Zr, Mg and Al, and diisoamyl ether in the following molar ratios:
Zr/Mg=0.005
Al/Zr=21
diisoamyl ether/Mg=0.026 c) Preparation of Ethylene in Suspension in N-hexane

The procedure was exactly as in Example 1.c., except that the catalyst was that prepared in Example 3.b.

A polyethylene powder was obtained, consisting of spheroidal particles which had Dm=150 microns and a Dm/Dn ratio=1.5. The melt index of the polyethylene was 1 g/10 minutes, measured at 190° C. under a 2.16 kg weight. The Mw/Mn ratio of the polyethylene was 2.1.

EXAMPLE 4 a) Preparation of a Support

The procedure was exactly as in Example 1.

b) Preparation of a Catalyst

A quantity of previously prepared support in the form of a dry powder corresponding to 100 millimoles of Mg was introduced at 25° C. under nitrogen atmosphere into a glass reactor with a capacity of 1 liter, equipped with a stirrer rotating at 350 revolutions/minute and with a heating and cooling system. 125 milliatoms of aluminium as (MAO) in solution at a concentration of 30% by weight in toluene were introduced into the reactor with stirring. The mixture thus obtained was then kept stirred at 25° C. for 2 hours. At the end of this period the stirring was stopped and the solid thus obtained was washed ten times, each with 200 ml of n-hexane at 25° C. A mixture containing 5 millimoles of (Cp2 Zr Cl2) and 125 milliatoms of aluminium as (MAO) in solution at a concentration of 30% by weight in toluene was added to the solid into the reactor with stirring. The mixture thus obtained was then kept stirred at 25° C. for 2 hours. At the end of this period the stirring was stopped and the catalyst thus obtained was washed ten times, each with 200 ml of n-hexane at 25° C. A solid catalyst was thus obtained in the form of spheroidal particles which had DM=35 microns and a Dm/Dn ratio=1.4. It contained the elements Zr, Mg and Al and diisoamylether in the following molar ratios:

Zr/Mg=0.021
Al/Zr=44.4
diisoamylether/Mg=0.02 c) Preparation of a Prepolymer

Into a 5 liter stainless steel reactor equipped with a stirrer rotating at 500 revolutions/minute were introduced under nitrogen 2 liters of n-hexane which were heated to 70° C., then a mixture consisting of 300 milliatoms of aluminium as (MAO) in solution at a concentration of 30% by weight is toluene and a quantity of previously prepared catalyst corresponding to 1.5 milliatoms of zirconium. Ethylene was then introduced into the reactor at a uniform rate of 120 g/h for 280 minutes. At the end of this period, the reactor was cooled at ambient temperature (20° C.) and the content of the reactor was transferred to a rotary evaporator and the solvent was evaporated off under reduced pressure at a temperature of 60° C. A prepolymer was thus obtained and stored under nitrogen. It contained 373 g of polyethylene per millimole of zirconium and the atomic ratio of Al/Zr was 244. It consisted of spheroidal particles having Dm=120 microns and a particle size distribution such that the ratio Dm/Dn=1.5.

d) Gas Phase Polymerization of Ethylene

A powder charge of 800 g of a polyethylene originating from a preceding polymerization and which had been stored under nitrogen, was introduced into a fluidized bed reactor of 18 cm diameter. The reactor was heated to 80° C. and ethylene was introduced into it, so as to obtain a pressure of 1 MPa. Ethylene passed upwardly through the bed with a fluidization speed of 30 cm/sec.

24 g of the previously prepared prepolymer were introduced into the fluidized bed reactor and the temperature in the bed was kept at 80° C. during 4 hours. A polyethylene powder was thus prepared, having a density of 0.947 g/cm$^3$, a melt index (ASTM D 1238 condition E) of 0.02 g/10 minutes, a molecular weight distribution such that Mw/Mn=1.5, a zirconium content of 4 ppm, a level of vinyl unsaturation of 0.4 per 1000 carbon atoms and a level of vinylidene unsaturation of 0.1 per 1000 carbon atoms. The powder consisted of spheroidal particles, having Dm=410 microns and a ratio Dm/Dn=1.5. It had a bulk density of 0.43 g/cm$^3$.

EXAMPLE 5 a) Preparation of a Support

The procedure was exactly as in Example 1.

b) Preparation of a Catalyst

A quantity of previously prepared support in the form of a dry powder corresponding to 100 millimoles of Mg was introduced at 25° C. under nitrogen into a glass reactor with a capacity of 1 liter, equipped with a stirrer rotating at 350 revolutions/minute and with a heating and cooling system. The reactor was heated to 70° C. 100 ml of a solution of (Cp2 Zr Cl2) in toluene containing 10 millimoles of zirconium were introduced into the reactor with stirring. The mixture was then kept stirred at 70° C. for 2 hours. At the end of this period, the stirring was stopped and the solid catalyst thus obtained was washed six times, each with 200 ml of n-hexane at 70° C. A solid catalyst was obtained in the form of spheroidal particles having Dm=35 microns and a ratio Dm/Dn=1.4. It contained the elements Zr and Mg, and diisoamylether in the following molar ratios:

Zr/Mg=0.04
diisoamylether/Mg=0.02 c) Preparation of a Prepolymer

Into a 5 liter stainless steel reactor equipped with a stirrer rotating at 500 revolutions/minute were introduced under nitrogen 2 liters of n-hexane which were heated to 70° C., then a mixture consisting of 513 milliatoms of aluminium as (MAO) is solution at a concentration of 30% by weight in toluene and a quantity of previously prepared catalyst corresponding to 2.25 milliatoms of zirconium. Ethylene was then introduced into the reactor at a uniform rate of 120 g/h for 120 minutes. At the end of this period, the reactor was cooled at ambient temperature (20° C.) and the content of the reactor was transferred to a rotary evaporator and the solvent was evaporated off under reduced pressure at a temperature of 60° C. A prepolymer was thus obtained and stored under nitrogen. It contained 130 g of polyethylene per millimole of zirconium and the atomic ratio of Al/Zr was 160. It consisted of spheroidal particles having Dm=100 microns and a particle size distribution such that the ratio Dm/Dn=1.5.

d) Gas Phase Polymerization of Ethylene

A powder charge of 800 g of a polyethylene originating from a preceding polymerization and which had been stored under nitrogen, was introduced into a fluidized bed reactor having a diameter of 18 cm. Ethylene was introduced into the reactor, so as to obtain a pressure of 1 MPa and to keep constant the pressure during the polymerization. Ethylene passed upwardly through the bed with a fluidization speed of 30 cm/sec.

29 g of the previously prepared prepolymer were introduced into the reactor and the temperature of the fluidized bed was kept constant at 80° C. during 4 hours. A polyethylene powder was thus prepared, having a density of 0.945 g/cm$^3$, a melt index (ASTM D 1238 condition E) of 0.02 g/10 minutes, a molecular weight distribution such that Mw/Mn=2.3, a zirconium content of 3 ppm, a level of vinyl unsaturation of 0.3 per 1000 carbon atoms and a level of vinylidene unsaturation of 0.1 per 1000 carbon atoms. The powder consisted of spheroidal particles, having Dm=450 microns and a ratio Dm/Dn=1.6, with a bulk density of 0.41 g/cm$^3$.

EXAMPLE 6

Gas Phase Copolymerization of Ethylene with Butene-1

A powder charge of 800 g of a copolymer of ethylene with butene-1, originating from a preceding copolymerization and which had been stored under nitrogen, was introduced into a fluidized bed reactor having a diameter of 18 cm. A gaseous mixture of 83% by volume of ethylene and 17% by volume of butene-1 was introduced into the reactor, so as to obtain a total pressure of 1 MPa and to keep constant the pressure during the copolymerization. The gaseous mixture passed upwardly through the bed with a fluidization speed of 30 cm/sec.

27 g of the prepolymer prepared in the Example 5 were introduced into the reactor and the temperature of the fluidized bed was kept constant at 80° C. during 4 hours. A copolymer of ethylene with butene-1 in the form of a powder was thus prepared, having a density of 0.914 g/cm$^3$, a melt index (ASTM D 1238 condition E) of 0.22 g/10 minutes, a molecular weight distribution such that Mw/Mn=2.3, a zirconium content of 3 ppm, a level of vinyl unsaturation of 0.3 per 1000 carbon atoms and a level of vinylidene unsaturation of 0.1 per 1000 carbon atoms. The powder consisted of spheroidal particles, having Dm=450 microns and a ratio Dm/Dn=1.6, with a bulk density of 0.35 g/cm$^3$.

We claim:
1. Solid catalyst suitable for a heterogeneous process for polymerizing one or more olefins, the solid catalyst consisting of spheroidal particles having a mass-average diameter, Dm, of 10 to 100 microns and a particle size distribution such that the ratio of Dm to the number-average diameter Dn, of the particles is not higher than 3, catalyst comprising:
   a support containing from 80 to 99.9 mol % of magnesium dichloride and from 0.1 to 20 mol % of at least one organic electron-donor compound, D, free from labile hydrogen,
   a zirconium metallocene, and optionally an organoaluminium compound.

2. Catalyst according to claim 1, characterized in that the organic electron-donor compound, D, is chosen from the group consisting of ethers, esters, thioethers, sulphones, sulphoxides, secondary amides, tertiary amines, tertiary phosphines and phosphoramides.

3. Process for the preparation of the solid catalyst according to claim 1, characterized in that:
   (1) a solid support (A) containing from 80 to 99.5 mol % of magnesium dichloride and from 0.5 to 20 mol % of at least one organic electron-donor compound, D, free from labile hydrogen, the said solid support being in the form of spheroidal particles having a mass-average diameter, Dm, of 10 to 100 microns and a particle size distribution such that the ratio of Dm to the number-average diameter, Dn, of the particles is not higher than 3, is brought into contact with
   (2) a zirconium metallocene (B), and optionally an organoaluminium compound (C).

4. Prepolymer particles comprising (i) polyethylene or copolymer of ethylene with up to 10% by weight of at least one C3 to C8 alpha-olefin and (ii) and active catalyst for a further (co-) polymerization of olefins, said catalyst essentially based on a zirconium metallocene and containing atoms of zirconium, magnesium, chlorine and aluminum, in a quantity such that the prepolymer contains from 1.0 to 500 g of polyethylene or copolymer of ethylene per millimole of zirconium and the atomic ratio Al/Zr is from 10 to 1000.

5. Prepolymer particles according to claim 4, characterized in that they consist of spheroidal particles, having a mass-average diameter, Dm, from 10 to 500 microns and a particle size distribution such that the ratio of Dm to the number-average diameter, Dn, of the particles is not higher than 3.

6. A process for preparing prepolymer particles defined in claim 4 which comprises contacting the active catalyst with ethylene or a mixture of ethylene and at least one C3 to C8 alpha-olefin in a liquid hydrocarbon slurry or in a gas phase, at a temperature from 0° to 100° C. under a total pressure of from 0.1 to 5 MPa, in the presence of an organoaluminum compound in a quantity such that the atomic ratio Al to Zr is from 10 to 1000.

7. A process as defined in claim 3, wherein solid support (A) is brought in contact with an organoaluminum compound (C).

8. A process as defined in claim 7, wherein the organoaluminum compound (C) is aluminoxane.

9. A catalyst according to claim 1, characterized in that the zirconium metallocene corresponds to the general formula

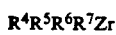

in which $R^4$ denotes a cycloalkadienyl radical or cycloalkadienyl radical substituted by at least one alkyl radical or at least one alkoxy radical, or substituted by a fused ring cycloalkadienyl group, and each of $R^5$, $R^6$ and $R^7$ being identical or different denotes a cycloalkadienyl radical, acycloalkadienyl radical substituted by at least one alky or alkoxy group, an aryl radical, an alkyl radical, a cycloalkyl radical, an aralkyl radical, a halogen atom, an alkoxy radical, or a hydrogen atom.

10. A catalyst according to claim 9, characterized in that $R^5$ represents a cycloalkadienyl radical or a substituted cycloalkadienyl radical or a fused ring cycloalkadienyl group, and $R^4$ and $R^5$ are bonded to each other either directly or via a lower alkylene group.

11. A catalyst according to claim 9, characterized in that the cycloalkadienyl radical is one with a conjugated C5 ring diene group.

12. A catalyst according to claim 1, characterized in that the zirconium metallocene comprises at least one Zr—X bond wherein X represents a chlorine or bromine atom.

13. A catalyst according to claim 9, characterized in that $R^4$, $R^5$, $R^6$ or $R^7$ are selected in the group consisting of methylcyclopentadienyl, ethylcyclopentadienyl, dimethylcyclopentadienyl, indenyl, ethylenebisindenyl and tetrahydroindenyl radicals.

14. A catalyst according to claim 1, characterized in that the zirconium metallocene is selected in the group consisting of bis(cyclopentadienyl)dichlorozirconium, bis(cyclopentadienyl) methylchlorozirconium and bis(4,5,6,7-tetrahydroindenyl) ethylenedichlorozirconium.

15. A catalyst according to claim 1, characterized in that the zirconium metallocene is present in the solid catalyst with a Zr/Mg atomic ratio ranging from 0.001 to 0.1.

16. A catalyst according to claim 1, characterized in that the organoaluminium compound is selected in the group consisting of a trialkylaluminium, an alkylaluminium halide and an alkylaluminium alkoxide, an alkylaluminium halide and an aluminoxane.

17. A catalyst according to claim 16, characterized in that the aluminoxane is either a linear aluminoxane corresponding to the general formula

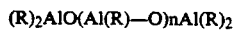

in which each R denotes an alkyl radical and n is a number ranging from 2 to 40, or a cyclic aluminoxane corresponding to the general formula

in which R and n are as defined above.

18. A process according to claim 3, characterized in that the quantities of the components used for preparing the solid catalyst are such that:
   the molar ratio of the quantity of Zr of the zirconium metallocene (B) to that of Mg of the solid support (A) us from 0.001 to 1,
   the molar ratio of the quantity of Al of the compound (C) to that of Zr of the zirconium metallocene (B) is from 0 to 1000.

19. A catalyst according to claim 3, characterized in that the support (A) is sued in the form of a dry powder or in the form of a suspension in a saturated aliphatic hydrocarbon or an aromatic hydrocarbon, and the zirconium metallocene (B) and the organoaluminium compound (C) are used in the form of solutions in hydrocarbon solvents.

20. Prepolymer particles according to claim 4, characterized in the zirconium metallocene corresponds to the general formula

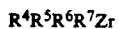

in which $R^4$ denotes a cycloalkadienyl radical or cycloalkadienyl radical substituted by at least one alkyl radical or at least one alkoxy radical, or substituted by a fused ring cycloalkadienyl group, and each of $R^5$, $R^6$ and $R^7$ being identical or different denotes a cycloalkadienyl radical, a cycloalkadienyl radical substituted by at least one alkyl or alkoxy group, an aryl radical, an alkyl radical, a cycloalkyl radical, an aralkyl radical, a halogen atom, an alkoxy radical, or a hydrogen atom.

21. Prepolymer particles according to claim 20, characterized in that $R^5$ represents a cycloalkadienyl radical or a substituted cycloalkadienyl radical or a fused ring cycloalkadienyl group, and $R^4$ and $R^5$ are bonded to each other either directly or via a lower alkylene group.

22. Prepolymer particles according to claim 20, characterized in that the cycloalkadienyl radical is one with a conjugated C3 ring diene group.

23. Prepolymer particles according to claim 4, characterized in that the zirconium metalocene comprises at least one Zr—X bond wherein X represents a chlorine or bromine atom.

24. Prepolymer particles according to claim 20, characterized in that $R^4$, $R^5$, $R^6$ or $R^7$ are selected in the group consisting of methylcyclopentadienyl, ethylcyclopentadiene, dimethylcyclopentadienyl, indenyl, ethylenebisindenyl and tetrahydroindenyl radicals.

25. Prepolymer particles according to claim 4, characterized int hat the zirconium metallocene is selected in the group consisting of bis(cyclopentadienyl)dichlorozirconium, bis(cyclopentadienyl)methylchlorozirconium and bis(4,5,6,7-tetrahydroindenyl)ethylenedichlorozirconium.

26. Prepolymer particles according to claim 4, characterized in that the zirconium metallocene is present in the prepolymer with a Zr/Mg atomic ratio ranging from 0.001 to 0.1.

27. Prepolymer particles according to claim 4, characterized in that they contain an organoaluminium compound selected in the group consisting of a trialkylaluminium, an alkylaluminium hydride, alkylaluminium alkoxide, an alkylaluminium halide and an aluminoxane.

28. Prepolymer particles according to claim 27, characterized in that the aluminoxane is either a linear aluminoxane corresponding to the general formula

in which each R denotes an alkyl radical and n is a number ranging from 2 to 40, or a cyclic aluminoxane corresponding to the general formula

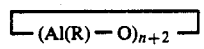

in which R and n are as defined above.

* * * * *

UNITED STATES PATENT AND TRADEMARK OFFICE
CERTIFICATE OF CORRECTION

PATENT NO. : 5,106,804

DATED : April 21, 1992

INVENTOR(S) : JEAN-CLAUDE BAILLY et al

It is certified that error appears in the above-identified patent and that said Letters Patent is hereby corrected as shown below:

Col. 8, line 25, should read "10° to 110°C."
    line 26, should read "presence of a cocatalyst"
Col. 11 line 45, should read "n-hexane"
    line 53, should read "Mw/Mn"
Col. 12 line 8, should read "of ethylene in suspension in n-hexane"
Col. 13 line 57, should read "(MAO) in"
Col. 15 line 23, after " (ii) " change "and" to --an--.
Col. 15 line 28, change "1.0" to --0.1--
Col. 15 line 60, should read "a cycloalkadienyl"
Col. 16 line 50, change "us" to --is--
Col. 16 line 55, correct the spelling of the word "used"
Col. 16 line 62, after "in" and before "the" insert --that--
Col. 17 line 17, correct the spelling of the word "metallocene"
Col. 17 line 26, correct the spelling of "in that"
Col. 18 line 10 & 11, after the word "hydride", and before "alkylaluminum" insert --an--
Col. 16 line 29, change "halide" to --hydride--, and strike "and"

Signed and Sealed this

Tenth Day of August, 1993

Attest:

MICHAEL K. KIRK

Attesting Officer        Acting Commissioner of Patents and Trademarks